United States Patent
Rude (12)

(10) Patent No.: US 6,229,863 B1
(45) Date of Patent: May 8, 2001

(54) REDUCING WAITING TIME JITTER

(75) Inventor: Michael J. Rude, Minnetonka, MN (US)

(73) Assignee: ADC Telecommunications, Inc., Minnetonka, MN (US)

( * ) Notice: Subject to any disclaimer, the term of this patent is extended or adjusted under 35 U.S.C. 154(b) by 0 days.

(21) Appl. No.: 09/184,627

(22) Filed: Nov. 2, 1998

(51) Int. Cl.[7] ............... H04L 25/36; H04L 25/40; H04L 7/00

(52) U.S. Cl. ............... 375/372; 370/505

(58) Field of Search ............... 370/505, 506, 370/516; 375/372, 371, 354

(56) References Cited

U.S. PATENT DOCUMENTS

| | | | |
|---|---|---|---|
| 4,397,017 | 8/1983 | Rokugo | 370/102 |
| 4,764,941 | 8/1988 | Choi | 375/112 |
| 4,791,652 | 12/1988 | McEachern et al. | 375/111 |
| 4,811,340 | 3/1989 | McEachern et al. | 370/102 |
| 4,862,485 | 8/1989 | Guinea et al. | 375/120 |
| 4,928,275 | 5/1990 | Moore et al. | 370/102 |
| 5,052,025 | 9/1991 | Duff et al. | 375/118 |
| 5,067,126 | 11/1991 | Moore et al. | 370/112 |
| 5,111,485 | 5/1992 | Serack | 375/112 |
| 5,132,970 | 7/1992 | Urbansky | 370/102 |
| 5,195,088 | 3/1993 | Urbansky | 370/84 |
| 5,260,940 | 11/1993 | Urbansky | 370/84 |
| 5,263,056 | 11/1993 | Urbansky et al. | 375/112 |
| 5,268,935 | 12/1993 | Mediaville et al. | 375/118 |
| 5,276,688 | 1/1994 | Urbansky | 370/102 |
| 5,280,502 | 1/1994 | Niegel et al. | 375/112 |
| 5,327,430 | 7/1994 | Urbansky | 370/84 |
| 5,331,671 | 7/1994 | Urbansky et al. | 375/118 |
| 5,337,315 | 8/1994 | Ehrlich | 370/102 |
| 5,337,334 | 8/1994 | Molloy et al. | 375/118 |
| 5,343,476 | 8/1994 | Urbansky | 370/102 |
| 5,359,605 | 10/1994 | Urbansky et al. | 370/102 |
| 5,361,263 | 11/1994 | Urbansky | 370/102 |
| 5,459,782 | 10/1995 | Volejnik | 375/372 |
| 5,504,752 | 4/1996 | Okazaki et al. | 370/102 |
| 5,534,822 | * 7/1996 | Taniguchi et al. | 331/2 |
| 5,539,785 | 7/1996 | Burch et al. | 375/371 |
| 5,563,891 | 10/1996 | Wang et al. | 370/102 |
| 5,619,506 | 4/1997 | Burch et al. | 370/506 |
| 5,621,775 | 4/1997 | Etienne | 375/372 |
| 5,642,357 | 6/1997 | Suzuki et al. | 370/505 |
| 5,680,422 | 10/1997 | Burch et al. | 375/371 |

FOREIGN PATENT DOCUMENTS

| | | | |
|---|---|---|---|
| 4339586 A1 | 5/1995 | (DE) | H04L/25/38 |
| 0813322 | 6/1996 | (EP) | H04L/7/04 |

OTHER PUBLICATIONS

Grover, W., et al., "Waiting Time Jitter Reduction by Synchronizer Stuff Threshold Modulation", IEEE Global Telecommunications Conference –1987 Conference Record Volume 1 of 3, Tokyo, Japan, 13.7.1 –13.7.5, (Nov. 15–18, 1987).

klein, M.J., et al., "Sonet/SDH Pointer Processor Implementations", *1994 IEEE Globecom*, San Francisco, 655–660, (Nov. 28—Dec.).

Kusky, R.G., et al., "Analysis of Techniques for the Reduction of Jitter Caused by Sonet Pointer Adjustments", *IEEE Transactions on Communication*, vol. 42, No. 2/3/4, Feb./Mar./Apr., 1994, 2036–2050, (Feb./Mar./Apr.).

(List continued on next page.)

*Primary Examiner*—Chi Pham
*Assistant Examiner*—Jean Corrielus
(74) *Attorney, Agent, or Firm*—Fogg Slifer & Polglaze, PA

(57) ABSTRACT

Circuits and methods are described which reduce waiting time jitter at a synchronizer/multiplexer by using a "sub-bit" comparison of a clock associated with an unsynchronized data stream and a clock associated with a synchronized data stream to generate a threshold level for use in determining when to stuff bits into the synchronized data stream. The term "sub-bit" means that the phase difference, as measured by, for example, the location of pointers associated with the two clocks, is precise to a fraction of a bit.

24 Claims, 5 Drawing Sheets

OTHER PUBLICATIONS

Unknown, "An Approach to Interoperable MTIE Compliance", Committee T1—Telecommincations Working Group T1E1.4 San Antonio, Texaz, Adtran, Inc.—HDSL2 Standard Project, 2 Pages, (Sep. 3, 1998).

Mulvey, M., et al., "Jitter/Wander Analysis of Adaptive Clock Recovery for Constant Bit Rate Services Over ATM", *BT Technology Journal*, 13, 46–51, (Jul., 1995).

* cited by examiner

REDUCING WAITING TIME JITTER

TECHNICAL FIELD OF THE INVENTION

The present invention relates generally to the field of telecommunications and, in particular, to reducing waiting time jitter in systems in which pulse stuffing is used to synchronize an asynchronous signal for transmission over a synchronous communication link.

BACKGROUND

When a connection is made through a telecommunications network, some portions of the connection may be asynchronous to the local clock of another portion or link of the connection. "Bit stuffing" techniques have been used to synchronize digital signals from an asynchronous link with a local clock of a synchronous link. These bit stuffing techniques selectively add bits to and/or subtract bits from frames of data to adjust the length of the frames for transmission over the synchronous link. Once synchronized, the digital signal can be conveniently switched or transmitted with other, similarly synchronized, digital signals.

One bit stuffing technique is positive stuffing, in which it is assured that the frequency of the synchronized data signal is equal to or greater than the highest possible frequency of the asynchronous data signal, and frequency differences are made up by the insertion of stuff bits. For example, an asynchronous DS1 data signal has a frequency of 1.544Mb/s±75 b/s, and may be converted by positive stuffing into a synchronized data signal with a frequency of at least 1.544075Mb/s. Generally, a higher frequency than this is used for the synchronized data signal in order to enable waiting time jitter, which arises as a result of the stuffing process and has a frequency component equal to the stuffing frequency, to be subsequently filtered out from the synchronized data signal.

Even though this technique of positive stuffing has been effective for some time, it cannot be readily used in a so-called synchronous transmission network in which incoming asynchronous and synchronous data signals must be accommodated to produce an outgoing synchronized data signal having substantially the same frequency as the incoming synchronous data signals. Synchronous networks are becoming of increasing importance in the communication of data signals.

In a synchronous network, an incoming synchronous data signal is already synchronized to the correct frequency so that there is no need to provide a synchronizing arrangement for such a signal. An incoming asynchronous data signal, however, can have a frequency which is either lower or higher than the synchronized data signal frequency, and a synchronizing arrangement is required in order to effect positive or negative stuffing, respectively, to produce a synchronized data signal from the asynchronous data signal. Whereas positive stuffing comprises providing a stuff bit in the synchronized data signal to compensate for a relatively lower asynchronous data signal frequency, negative stuffing comprises using a 'spare' bit of the synchronized data signal for transmitting data to compensate for a relatively higher asynchronous data signal frequency.

With this positive/negative stuffing, the synchronized data signal has a waiting time jitter component at a frequency which is equal to the rate of positive or negative stuffing. The closer the asynchronous data signal frequency is to the synchronized data signal frequency, the lower will be the stuffing rate and hence the jitter component frequency, rendering it more difficult to filter out the jitter from the synchronized data signal. Using a phase-locked loop (PLL) to filter out jitter, the need to handle lower frequency jitter components results in the disadvantages of increased acquisition times, memory requirements, and latency.

In a bit stuffing synchronizing arrangement, this jitter component, referred to generally as "waiting time jitter," has a frequency which is equal to the nominal rate of positive or negative stuffing. For example, if the tributary data is an asynchronous DS1 bit stream having a nominal bit rate of 1.544 Mb/s and an actual bit rate which may be up to 75 b/s more or less than this, then the jitter component will have a frequency in the range from 0 to 75 Hz. The closer the asynchronous bit stream rate is to the nominal rate, the lower the frequency of the jitter component.

In a receiver to which the bit stream is ultimately transmitted, a dejittering phase locked loop (PLL) is provided to reduce jitter, but this generally has a lower cut-off frequency of at least about 3 Hz so that most jitter due to stuffing is not attenuated by this PLL. This gives rise to a significant problem in the handling of asynchronous digital bit streams in some synchronous networks. The cut-off frequency of the receiver PLL cannot be substantially reduced to avoid the problem because this would unacceptably increase the acquisition of the PLL and elastic storage requirements, and in any event this cut-off frequency would have to be reduced to 0 to handle all possible jitter frequency components.

For the reasons stated above, and for other reasons stated below which will become apparent to those skilled in the art upon reading and understanding the present specification, there is a need in the art for circuits and methods for reducing waiting time jitter in telecommunications networks.

SUMMARY OF THE INVENTION

The above mentioned problems with telecommunications networks and other problems are addressed by the present invention and will be understood by reading and studying the following specification. Circuits and methods are described which reduce waiting time jitter by using, at a synchronizer/multiplexer, a "sub-bit" comparison of a clock associated with an unsynchronized data stream and a clock associated with a synchronized data stream to generate a threshold level for use in determining when to stuff bits into the synchronized data stream. The term "sub-bit" means that the phase difference, as measured by, for example, the location of pointers associated with the two clocks, is precise to a fraction of a bit or has a "fractional component." This sub-bit comparison essentially measures the waiting time jitter and is used to adjust the threshold level so as to reduce at least the low frequency components of the waiting time jitter at the synchronizer/multiplexer before transmission to the desynchronizer/demultiplexer.

DETAILED DESCRIPTION

The following detailed description refers to the accompanying drawings which form a part of the specification. The drawings show, and the detailed description describes, by way of illustration specific illustrative embodiments in which the invention may be practiced. These embodiments are described in sufficient detail to enable those skilled in the art to practice the invention. Other embodiments may be used and logical, mechanical and electrical changes may be made without departing from the scope of the present invention. The following detailed description is, therefore, not to be taken in a limiting sense.

Figure 1:
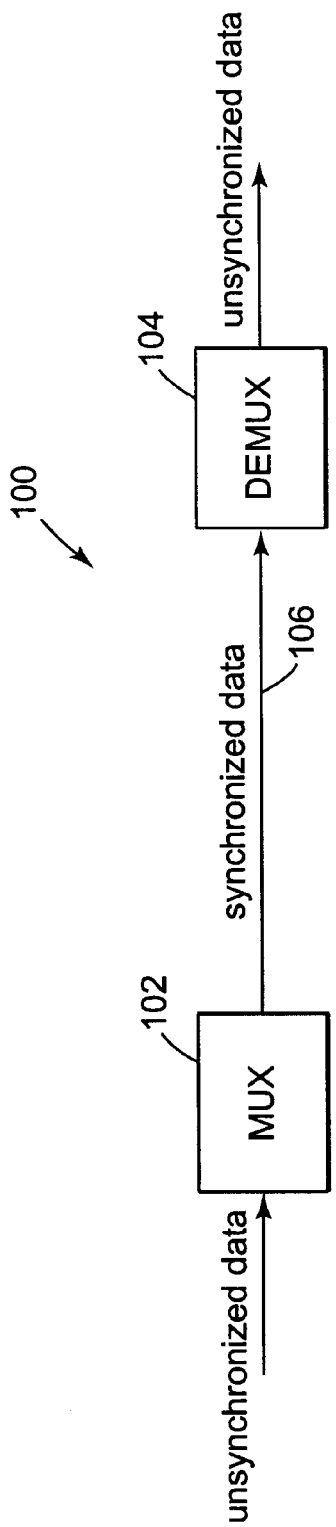
FIG. 1 is a block diagram of an embodiment of a communications system according to the teachings of the present invention.

FIG. 1 is a block diagram of an embodiment of a communications system, indicated generally at 100, according to the teachings of the present invention. System 100 includes multiplexer (MUX) 102 and demultiplexer (DEMUX) 104 that are coupled by synchronous link 106. Link 106 comprises, for example, an high-bi-rate digital subscriber line ("HDSL") link over a medium such as microwave, wired or other appropriate medium. Link 106 may comprise any other appropriate synchronous transmission medium or link.

Figure 2:
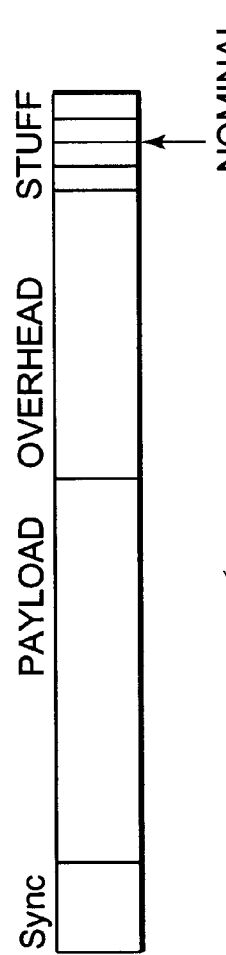
FIG. 2 is a schematic representation of an embodiment of a data packet.

Multiplexer 102 receives data in an unsynchronized format, e.g., DS1 data. The unsynchronized data can be other conventional or later developed asynchronous data formats that are coupled to and transmitted over a portion of a synchronous link or transmission medium. System 100 uses stuff bits at multiplexer 102 to synchronize the unsynchronized data with the clock of link 106. As shown in FIG. 2, multiplexer 102 creates frames from the received, unsynchronized data. The frames include a number of fields. These fields include synchronization (sync) bits, payload data, overhead data and a number of stuff bits. As described above, this number of stuff bits can vary from frame to frame. In the embodiment shown in FIG. 2, the nominal case is to include two stuff bits. Multiplexer 102 can depart from this nominal case by including more or fewer bits in the frame to create an acceptable stream of data that is synchronized for transmission over link 106.

At demultiplexer 104, the synchronized data is desynchronized.

As described above, when clocks associated with the synchronized and unsynchronized data streams are close in frequency, low frequency waiting time jitter may be introduced by the bit stuffing process. Advantageously, multiplexer 102 uses an adjustable threshold level to determine when to compensate for a difference in these clocks by stuffing bits into the synchronized data stream. This threshold level is determined based on a sub-bit comparison of a clock associated with the unsynchronized data stream and a clock associated with the synchronized data stream. This "sub-bit" comparison essentially measures the approximate waiting time jitter introduced into the synchronized data stream. Based on the sub-bit comparison, the threshold level used to determine when to insert stuff bits into the synchronized data stream is varied among, for example, two or three levels so as to compensate for, or reduce, the waiting time jitter at multiplexer 102.

Figure 3:
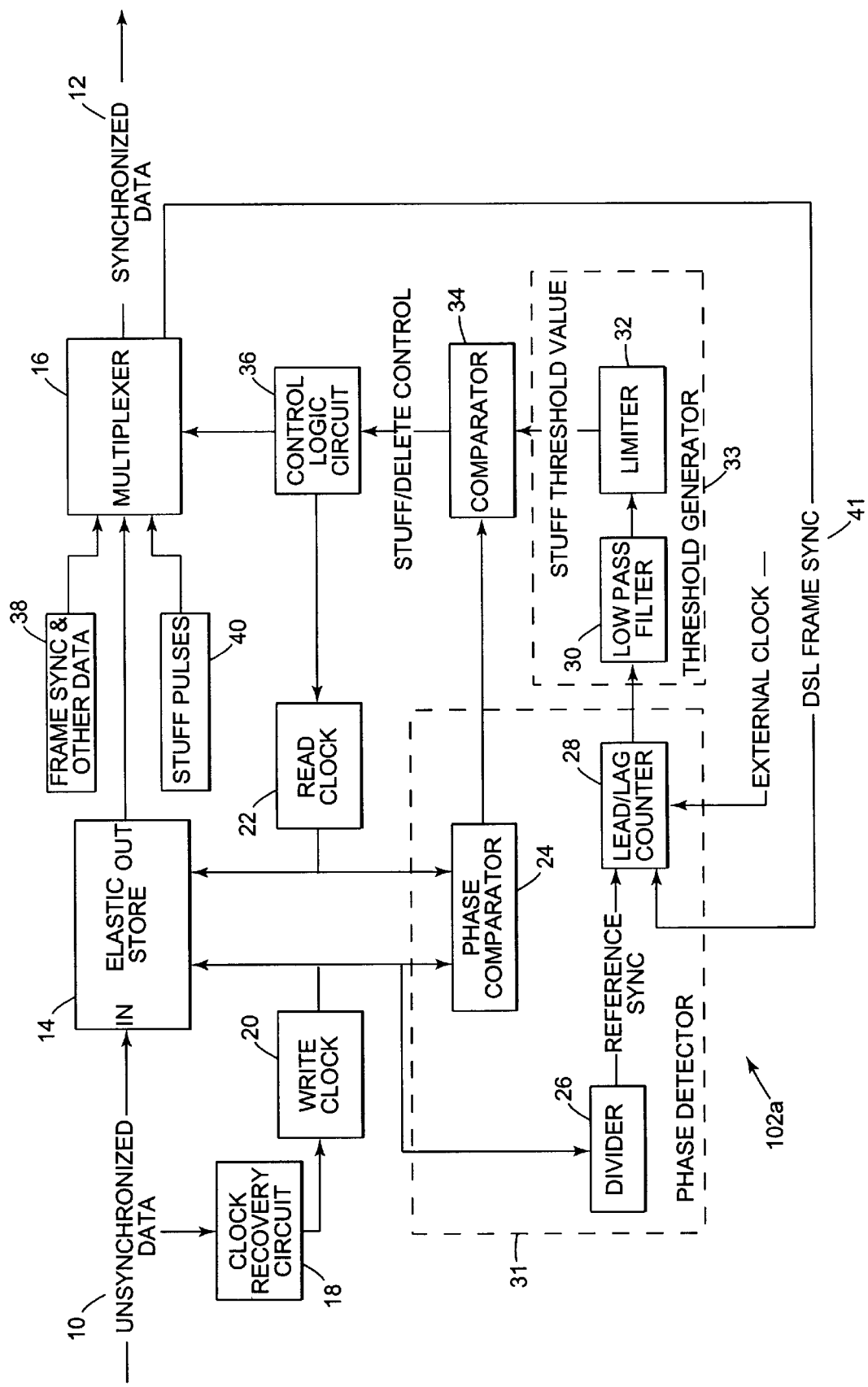
FIG. 3 is a block diagram of one embodiment of a synchronizer/multiplexer circuit for use in the system of FIG. 1.

FIG. 3 is a block diagram of an embodiment of a synchronizer/multiplexer circuit, referred to generally as "multiplexer 102*a*," for use in system 100 of FIG. 1. Multiplexer 102*a* receives an unsynchronized data stream at input 10 and produces a synchronized data stream at output 12. Multiplexer 102*a* includes elastic store 14 that acts as a buffer to store the unsynchronized data that arrives at input 10. Clock recovery circuit 18 and write clock 20 are coupled to provide a clock signal to control the storage of the unsynchronized data in elastic store 14.

Read clock 22 controls the reading of data out of elastic store 14 to create the synchronized data stream at output 12.

Write clock 20 and read clock 22 are both coupled to phase comparator 24 to control when stuff pulses or bits are inserted into the synchronized data stream at output 12. Phase comparator 24 provides an input to comparator 34. Comparator 34 provides a stuff/delete control signal to control logic 36. Control logic 36 further provides an input to read clock 22 and a control signal to multiplexer 16. This control signal indicates to multiplexer 16 when to insert pulses or "stuff bits" (indicated at block 40) into the synchronized data stream at output 12. For example, if read clock 22 is slightly slower than write clock 20, control logic 36 instructs multiplexer 16 to, in effect, delete stuff pulses from selected frames in the synchronized data stream at output 12. This allows the read clock 22 to catch up with the write clock 20. Alternatively, if read clock 22 is too fast, control logic 36 instructs multiplexer 16 to add more stuff pulses to, in effect, slow down read clock 22. Thus, phase comparator 24, comparator 34, and control logic 36 work to create a synchronized data stream at output 12 from the unsynchronized data stream at input 10.

Multiplexer 16 is coupled to receive three inputs that can be included in the synchronized data stream at output 12. First, the output of elastic store 14 provides the data from unsynchronized data at input 10. Additionally, frame sync and other data are provided at block 38. As mentioned above, stuff pulses are also provided at block 40. The control signal from control logic circuit 36 controls the generation of the stream of data at output 12 by multiplexer 16 using data from elastic store 14, block 38 and block 40.

Multiplexer 102*a* also includes a control circuit that is used to reduce the introduction or effect of low frequency waiting time jitter on the synchronized data stream at output 12. In this embodiment, this control circuit includes phase detector 31 and threshold generator 33. Phase detector 31 essentially provides a measure of the waiting time jitter in the synchronized data stream at output 12. Threshold generator 33 modifies the threshold value used by comparator 34 to make stuff decisions so as to compensate for or reduce the effect of low frequency waiting time jitter in the synchronized data stream at output 12.

Phase detector 31 compares two clock signals and produces an output signal. Phase detector 31 includes divider 26 that is coupled to receive a first clock signal from write clock 20. Divider 26 divides this clock signal down to produce a reference sync signal. The divide-by-value is chosen such that the nominal reference sync signal out of divider 26 is substantially the same frequency as the nominal frame rate. For instance, when transmitting DS1 over HDSL2, there are 9264 DS1 data bits in one HDSL2 frame. Therefore, the divider 26 for HDSL2 transmission would have a divide-by-value of 9264. The divide-by-value of divider 26 can be varied when other data formats are used for the synchronized and unsynchronized data.

The second clock signal is frame sync 41 taken from multiplexer 16. This frame sync is, in one embodiment, a DSL frame synchronization clock signal. Frame sync 41 and the reference sync signal from divider 26 are provided to lead/lag counter 28 to produce a signal to threshold generator 33. Lead/lag counter 28 is controlled by an external clock with a frequency that is sufficient to create an error signal with sub-bit or fractional precision. This error signal is provided to threshold generator 33.

Figure 4:
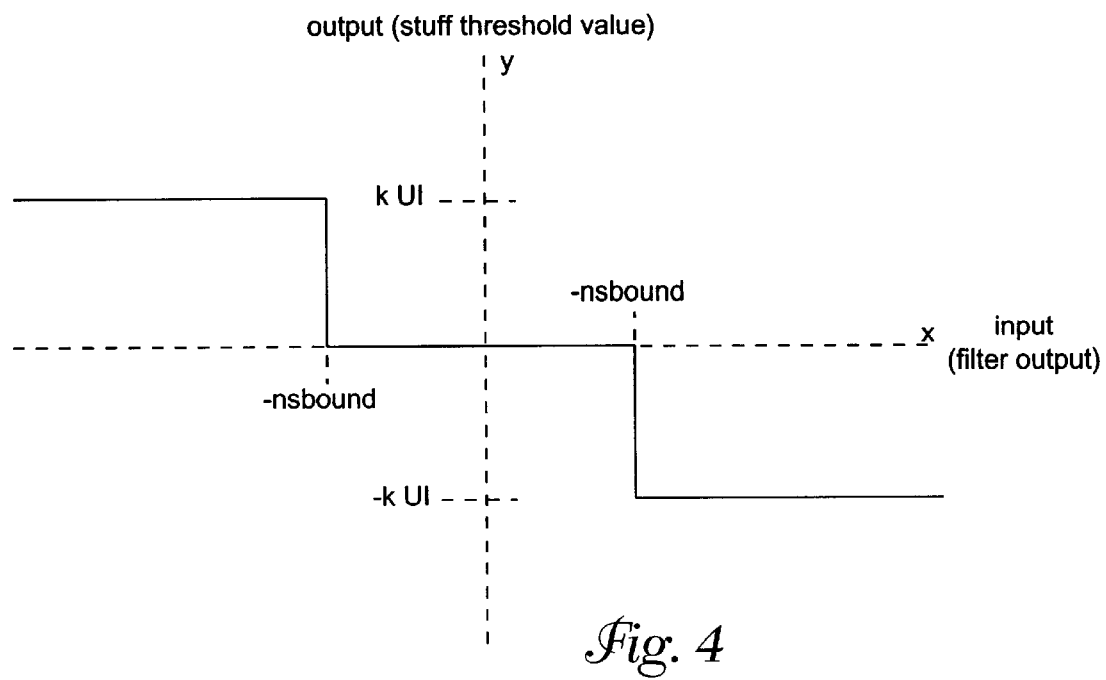
FIG. 4 is a graph that illustrates an embodiment of a decision criteria for a limiter circuit of FIG. 3.

Threshold generator 33 includes low pass filter 30 and limiter 32. Low pass filter 30 filters the error signal from phase detector 31 to produce a signal that represents the low frequency waiting time jitter in the synchronized data stream at output 12. The bandwidth of low pass filter 30 is on the order of 3 Hz or less. Limiter 32 is coupled to low pass filter 30 and creates a threshold level based on the output of low pass filter 30. For example, FIG. 4 provides a graph that represents the function of limiter 32. In the graph of FIG. 4, the output of low pass filter 30 is plotted along the X axis and the output of limiter 32 is plotted along the Y axis. In this example, limiter 32 can produce one of three stuff threshold values based on the detected low frequency waiting time jitter; namely, K unit intervals (UI), 0 UI, or −K UI. The magnitude of the value K depends on the application but is a constant for a given combination of nominal data clock and frame structure. The value of K must be large enough to effect a change in the existinigstuff/delete pattern and reduce waiting time jitter. For minimum waiting lime jitter, the smallest effective value of K should be used. For instance, HDSL and HDSL2 are both used to transmit DS1 data although their frame structures are different. The appropriate value of K is 2 for HDSL and 1 for HDSL2.

If the output of filter 30 is above a selected value, nsbound, then limiter 32 outputs a stuff threshold of −K UI. If the output of filter 30 is below a second selected value, -nsbound, then limiter 32 outputs a stuff threshold of +K UI. Finally, if the output of filter 30 is between the two selected levels, then limiter 32 outputs a nominal stuff threshold of 0 UI. The variation of the stuff threshold level allows comparator 34 to selectively insert stuff bits so as to reduce the effect of waiting time jitter at the generation of the synchronized data stream at output 12.

In another embodiment, the values for nsbound and -nsbound can be set equal to each other such that limiter 32 only produces one of two possible output levels. Further, it is noted that other output levels for limiter 32 can be chosen for a specific implemnntation.

Figure 5:
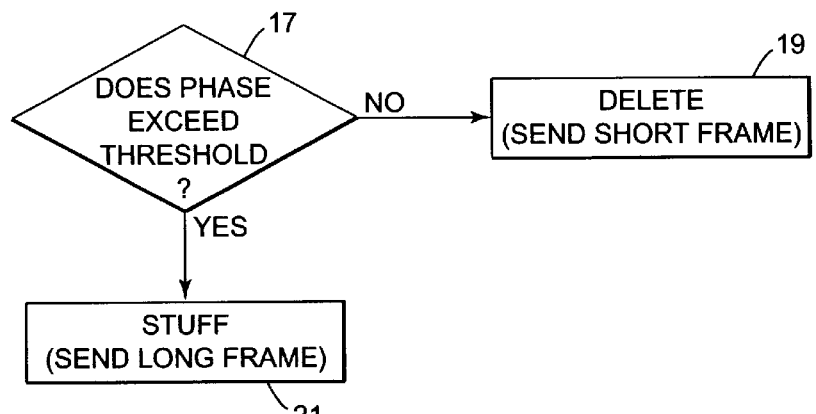
FIG. 5 is a flow chart that illustrates an embodiment of a process for controlling the insertion of stuff pulses in a synchronizer/multiplexer circuit.

FIG. 5 is a flow chart of an embodiment of a process for comparator 34. Comparator 34 makes a decision at block 17 as to whether the measured phase from phase comparator 24 exceeds the threshold level indicated by threshold generator 33. If not, then a short frame is sent. If, however, the phase difference does exceed the threshold, then a stuff decision is made and a long frame is sent.

Figure 6:
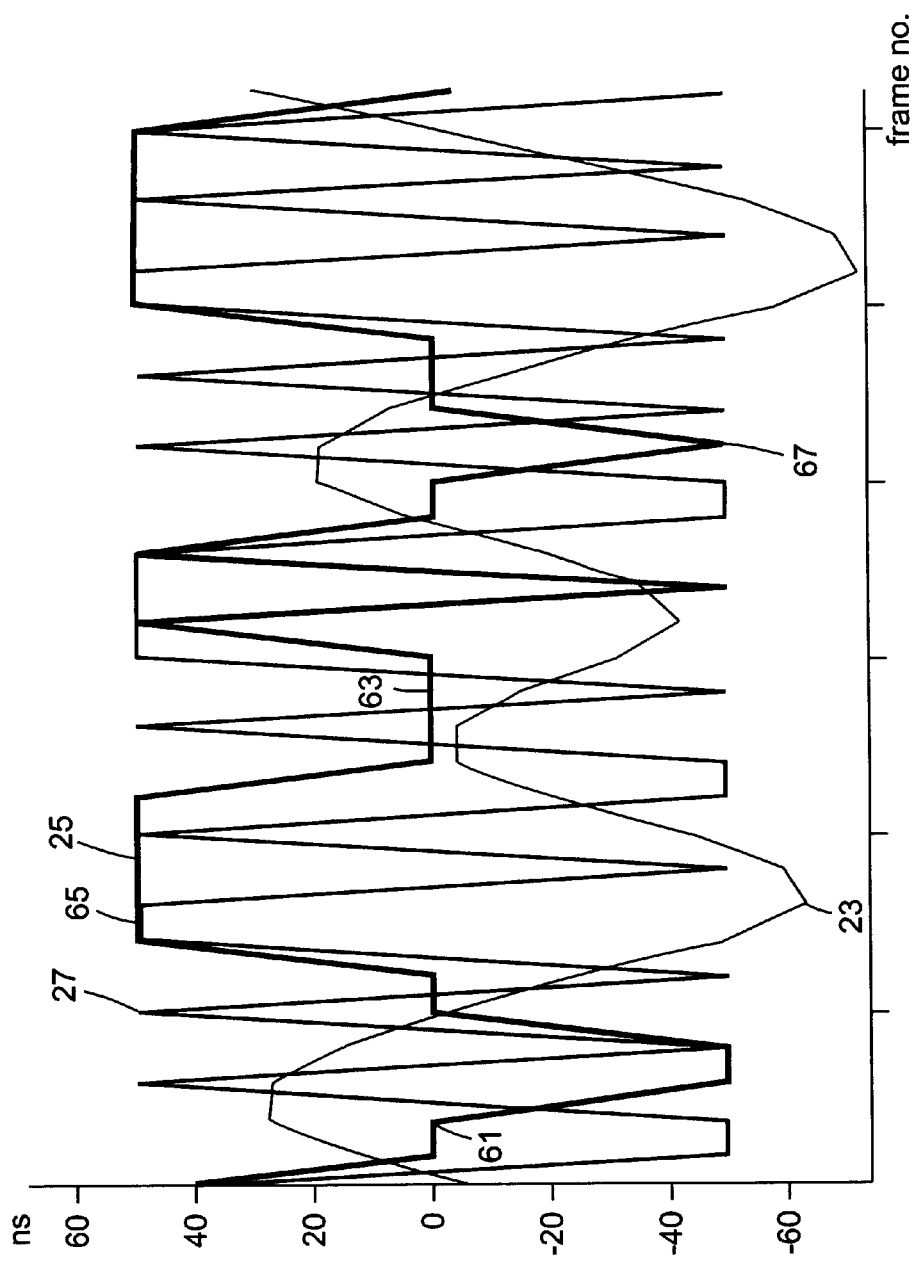
FIG. 6 is a graph that illustrates representative signals for the operation of the synchronizer/multiplexer of FIG. 3.

FIG. 6 is a graph that represents the operation of multiplexer 102a on a test unsynchronized data stream at input 10. This graph includes three traces; namely filter trace 23, threshold trace 25 and stuff trace 27. The values for nsbound and -nsbound in this example were set at +20 nanoseconds (ns) and −20 ns, respectively. Further, limiter 32 produced a stuff threshold value with one of three possible levels; namely, −1, 0 and +1.

Filter trace 23 is the output of filter 30. This trace represents, effectively, the low frequency waiting time jitter of the synchronized data stream at output 12. When the level of filter trace 23 stays between the ±20 ns, stuff threshold trace 25 stays at 0 UI as identified, for example, at 61 and 63. When the level of filter trace 23 travels below −20 ns, the threshold level is increased to 1 IU as shown, for example, by threshold trace 25 at 65. When filter trace 23 exceeds +20 ns, the threshold is decreased to −1 IU to compensate as shown, for example, at 67. This modification of the threshold level based on the level of the output of filter 30 reduces the tendency of the error signal from phase detector 31 to move in one direction or the other, and consequently, the waiting time jitter is reduced.

Figure 7:
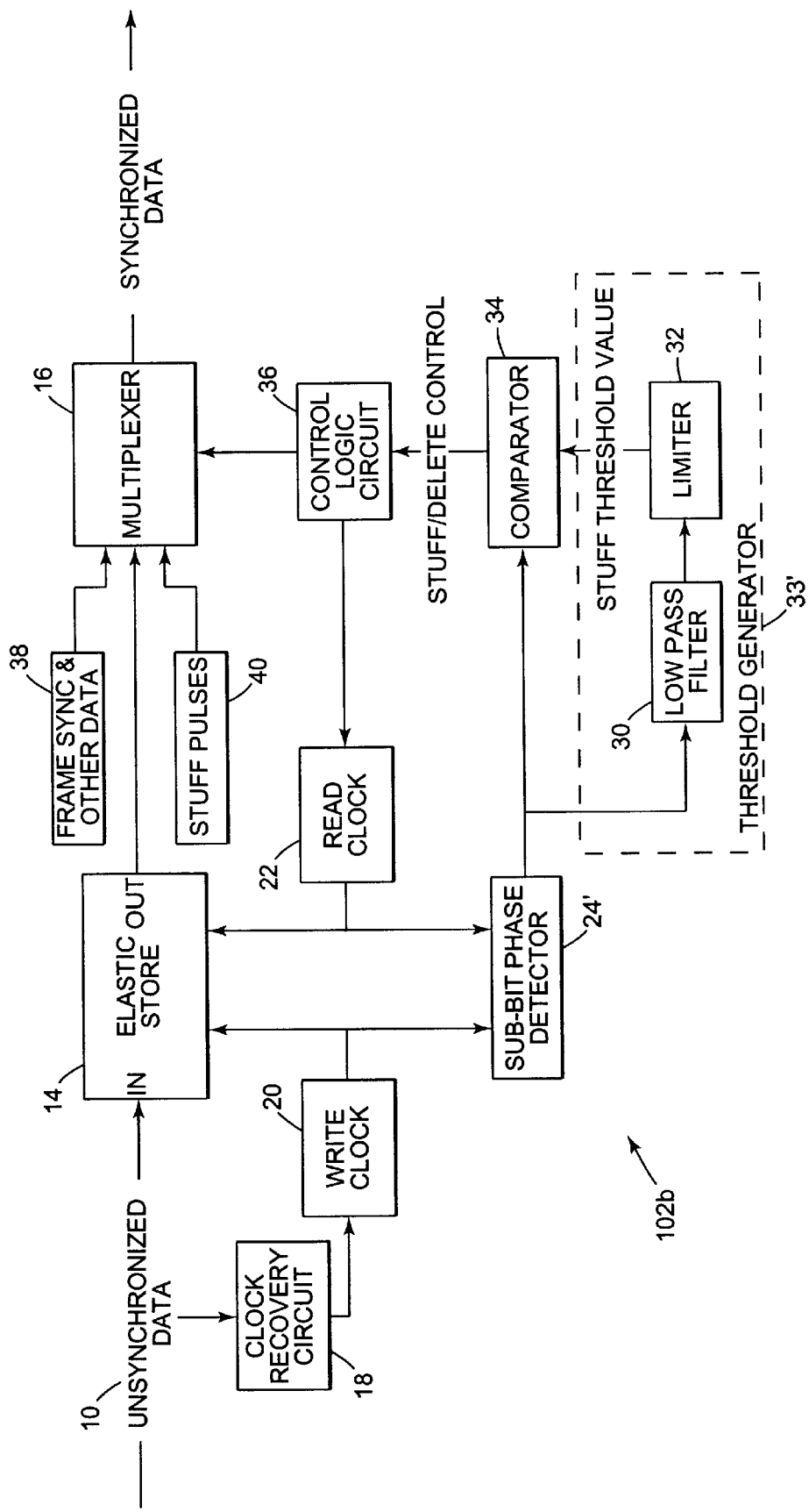
FIG. 7 is a block diagram of an another embodiment of a synchronizer/multiplexer according to the teachings of the present invention

FIG. 7 is a block diagram of an alternative embodiment of a synchronizer/multiplexer, indicated generally at 102b, according to the teachings of the present invention. Multiplexer 102b varies from multiplexer 102a in the manner in which the sub-bit phase detection is accomplished. Therefore, for simplicity, the similar aspects of multiplexer 102a will not be repeated here.

Multiplexer 102b includes sub-bit phase detector 24' which compares the phase difference of write and read clocks 20 and 22, in a manner that provides a signal that includes both a bit level and a sub-bit or fractional comparison of the relative phases of the clocks. The bit level component of the comparison is provided to comparator 34 to be used in determining when to insert stuff bits into the synchronized data stream at output 12. The sub-bit level comparison is used by threshold generator 33' to set the threshold level for comparator 34. Threshold generator 33' operates in a similar manner as threshold generator 33 of FIG. 1.

In this embodiment, the comparison of write clock 20 and read clock 22 on a sub-bit or fractional level provides an approximate measurement of the waiting time jitter in a manner similar to lead/lag counter 28 of FIG. 1.

CONCLUSION

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, the output of limiter 32 could be provided to an adder in the path between phase detector 24 or 24' and comparator 34 to effectively modify the threshold of comparator 34 by modifying the error signal provided to the comparator. Further, the values used as the threshold can be modified as necessary for a specific application. Threshold levels other than −1, 0 and +1 UI could be used. Further, other clocks that can give a measure of the waiting time jitter at the multiplexer can be used as a basis for generating a threshold level for comparator 34.

What is claimed is:

1. A method for reducing waiting time jitter in a system using bit stuffing synchronization, the method comprising:

receiving an unsynchronized data stream;

writing the data of the unsynchronized data stream to an elastic store;

reading the data from the elastic store as part of a synchronized data stream;

detecting a sub-bit phase difference of clocks associated with the synchronized and unsynchronized data streams;

filtering the sub-bit phase difference;

varying a threshold level based on the filtered sub-bit phase difference;

comparing the clocks associated with the synchronized and unsynchronized data streams with the threshold level; and controlling the length of frames in the synchronized data stream based on the comparison with the threshold level by selectively stuffing bits into the frames so as to reduce the waiting time jitter.

2. The method of claim 1, wherein detecting a sub-bit phase difference comprises comparing a divided down write clock with a frame synchronization signal for the synchronized data stream using a lead-lag counter.

3. The method of claim 1, wherein detecting a sub-bit phase difference comprises comparing pointers of read and write clocks with a sub-bit precision.

4. The method of claim 1, wherein filtering the sub-bit difference comprises low-pass filtering the sub-bit difference.

5. The method of claim 1, wherein varying the threshold level comprises:
when the sub-bit phase difference is greater than a selected level, setting the threshold at a first level; and
when the sub-bit phase difference is less than the selected level, setting the threshold at a second different level.

6. The method of claim 1, wherein varying the threshold level comprises:
when the sub-bit phase difference is greater than a first selected level, setting the threshold at a first level;
when the sub-bit phase difference is less than a second selected level, setting the threshold at a second different level; and
when the sub-bit phase difference is between the first and second selected levels, setting the threshold at a third level.

7. A method for reducing waiting time jitter in a synchronizer, the method comprising:
generating a sub-bit phase comparison of read and write clocks used to pass unsynchronized data through an elastic store;
comparing read and write pointers for the read and write clocks with a threshold level;
generating a frame of synchronized data from the data in the elastic store with a length that is dependent on the result of comparing the read and write pointers with the threshold level; and
selecting the threshold level used in comparing the read and write pointers based on the generated sub-bit phase comparison so as to reduce waiting time jitter;
wherein generating the sub-bit phase comparison comprises dividing down the write clock and comparing the divided write clock with a frame synchronization signal for the synchronized data.

8. The method of claim 7, wherein selecting the threshold level comprises filtering the sub-bit phase comparison.

9. The method of claim 7, wherein selecting the threshold level comprises:
filtering the sub-bit phase comparison with a low pass filter; and
selecting between at least two threshold levels.

10. The method of claim 9, wherein selecting between at least two threshold levels comprises selecting between −K, 0 and K unit intervals, wherein a magnitude of the value K is a constant.

11. A synchronizer circuit, comprising:
an elastic store that receives an unsynchronized data stream;
a write clock that controls the writing of data to the elastic store;
a read clock that controls the reading of data from the elastic store;
a multiplexer that receives the data read from the elastic store;
a phase detector that compares the phase of the read and write clocks;
a threshold generator that generates a variable threshold value based on a first output of the phase detector;
a comparator that compares a second output of the phase detector with the threshold value, wherein the second output is different from the first output; and
a control logic coupled to the multiplexer that controls the insertion of stuff bits based on the output of the comparator so as to reduce waiting time jitter.

12. The synchronizer of claim 11, wherein the phase detector produces a sub-bit phase comparison of the read and write clocks.

13. The synchronizer of claim 11, wherein the threshold generator generates the threshold value based on a sub-bit phase comparison from the phase detector.

14. The synchronizer of claim 11, wherein the phase detector includes a lead-lag counter.

15. The synchronizer of claim 11, wherein the threshold generator includes a low pass circuit that filters the first output of the phase detector.

16. The synchronizer of claim 15, wherein the threshold generator includes a limiter circuit that selects a threshold value based on the filtered first output of the phase detector.

17. The synchronizer of claim 11, wherein the first output of the phase detector is a sub-bit component of an output signal of the phase detector, and wherein the second output of the phase detector is a bit-level component of the output signal of the phase detector.

18. The synchronizer of claim 11, wherein the phase detector includes a lead-lag counter controlled by an external clock with a frequency sufficient to create the first output with sub-bit precision, and a phase comparator to produce the second output.

19. A synchronizer, comprising:
an elastic store that receives an unsynchronized data stream;
a multiplexer, coupled to the elastic store, that produces a synchronized data stream from the unsynchronized data stream by the controlled insertion of stuff bits; and
a control circuit that controls the insertion of stuff bits into the synchronized data stream based on a comparison of the phase difference of clocks associated with the synchronized and unsynchronized data streams with a variable threshold level that is generated from a sub-bit phase comparison of clocks associated with the synchronized and unsynchronized data streams so as to reduce waiting time jitter.

20. The synchronizer of claim 19, further comprising:
a low pass filter that receives the sub-bit phase comparison; and
a limiter, coupled to the control circuit, that selects one of at least two threshold levels based on an output of the low pass filter.

21. The synchronizer of claim 19, further comprising a lead-lag counter that generates the sub-bit phase comparison.

22. A telecommunications network, comprising:
a synchronizer;
a desynchronizer;
a synchronous link coupling the synchronizer to the desynchronizer; and wherein the synchronizer includes:
- an elastic store that receives an unsynchronized data stream;
- a multiplexer, coupled to the elastic store, that produces a synchronized data stream from the unsynchronized data stream by the controlled insertion of stuff bits; and
- a control circuit that controls the insertion of stuff bits into the synchronized data stream based on a comparison of the phase difference of clocks associated with the synchronized and unsynchronized data streams with a variable threshold level that is generated from a sub-bit phase comparison of clocks associated with the synchronized and unsynchronized data streams so as to reduce waiting time jitter.

23. The network of claim 22, further comprising:
- a low pass filter that receives the sub-bit phase comparison; and
- a limiter, coupled to the control circuit, that selects one of at least two threshold levels based on an output of the low pass filter.

24. The network of claim 22, further comprising a lead-lag counter that generates the sub-bit phase comparison.

* * * * *

UNITED STATES PATENT AND TRADEMARK OFFICE
CERTIFICATE OF CORRECTION

PATENT NO. : 6,229,863 B1  
APPLICATION NO. : 09/184627  
DATED : May 8, 2001  
INVENTOR(S) : Rude Page 1 of 1

It is certified that error appears in the above-identified patent and that said Letters Patent is hereby corrected as shown below:

At Claim 5, Column 7, Line 19, please insert a --,-- after the word "second"

At Claim 6, Column 7, Line 26, please insert a --,-- after the word "second"

Signed and Sealed this

Thirtieth Day of October, 2007

JON W. DUDAS  
*Director of the United States Patent and Trademark Office*